United States Patent
Choi et al.

(10) Patent No.: US 6,817,638 B1
(45) Date of Patent: Nov. 16, 2004

(54) BUMPER SYSTEM

(75) Inventors: Won-Jun Choi, Daejeon (KR); Dong-Won Shin, Seoul (KR); Nam-Hyeong Kim, Daejeon (KR)

(73) Assignee: Hanwha L&C Corporation (KR)

( * ) Notice: Subject to any disclaimer, the term of this patent is extended or adjusted under 35 U.S.C. 154(b) by 0 days.

(21) Appl. No.: 10/704,878

(22) Filed: Nov. 10, 2003

(30) Foreign Application Priority Data

Jun. 27, 2003 (KR) .............................. 10-2003-0042839

(51) Int. Cl.[7] .............................................. B60R 19/26
(52) U.S. Cl. ...................................... 293/109; 293/120
(58) Field of Search ................................ 293/109, 120, 293/121, 136

(56) References Cited

U.S. PATENT DOCUMENTS

| | | | | |
|---|---|---|---|---|
| 5,005,887 A | * | 4/1991 | Kelman | ....................... 293/120 |
| 5,139,297 A | * | 8/1992 | Carpenter et al. | .......... 293/132 |
| 5,725,266 A | * | 3/1998 | Anderson et al. | ........... 293/120 |
| 6,325,431 B1 | * | 12/2001 | Ito | .............................. 293/102 |
| 6,485,072 B1 | * | 11/2002 | Werner et al. | .............. 293/132 |
| 6,547,295 B2 | * | 4/2003 | Vismara | ..................... 293/133 |
| 6,644,701 B2 | * | 11/2003 | Weissenborn et al. | ...... 293/120 |

* cited by examiner

*Primary Examiner*—Stephen Gordon
(74) *Attorney, Agent, or Firm*—St. Onge Steward Johnston & Reens LLC

(57) ABSTRACT

Disclosed is a bumper system including a bumper cover, an energy absorber formed of a synthetic resin material through a foam molding process, an impact beam for supporting the energy absorber, the impact beam being formed of a glass mat thermoplastic and having a "C"-shaped section, and a stay for connecting the impact beam to a vehicle body. Tips are formed on front upper and lower portions of the impact beam, and a web portion is formed on the impact beam between the tips. Tip insertion grooves in which the tips are inserted are formed on an inner surface of the energy absorber, and a pressure receiving surface corresponding to the web portion is formed on the inner surface of the energy absorber.

5 Claims, 4 Drawing Sheets

BUMPER SYSTEM

This application claims priority from pending Korean Patent Application No. 2003-42839 filed on Jun. 27, 2003.

FIELD OF THE INVENTION

The present invention relates to a bumper system, and more particularly, to a bumper system that is designed to have a lightweight and a small volume while providing a high impact absorption performance, and that is designed to comprise individual components that can be replaced when they are damaged by impact, thereby reducing repairing cost.

BACKGROUND OF THE INVENTION

Generally, a bumper is attached to either end of a vehicle to absorb impact in a collision, thereby protecting passengers. As shown in FIG. 1, a conventional bumper system comprises a bumper cover 1 defining an outer appearance of the bumper system, an energy absorber 2 formed of an elastic material such a polypropylene foam body or an urethane foam body to absorb impact energy, an impact beam for supporting the energy absorber 2, and a stay 4 for connecting the impact beam 3 to a vehicle body.

The impact beam has previously been formed of a steel material having a closed or "C"-shaped section. However, in recent years, to meet with a tendency toward more lightweight and compact vehicles, impact beams formed of a variety of materials have been developed. Particularly, as it has been proven that an impact beam formed of a glass mat thermoplastic (GMT) through a compression molding process is superior to other materials, it is widely employed to vehicles for export to North America where there are very strict regulations.

However, the conventional GMT-made impact beam is, as shown in FIG. 2, formed to be thick through its overall body to provide a necessary rigidity and strength. Therefore, the space saving and weight reducing effect is not so remarkable when compared with the steel beam. In addition, when tips are formed on an upper/lower end of the beam to improve the performance, the bumper cover and the energy absorber may be damaged by the tips in the case where the mounting space is not sufficient. Furthermore, although a reinforcing sheet has been applied to several conventional beams, since there is a need for an additional process for forming the reinforcing sheet, the manufacturing costs are increased.

Meanwhile, the energy absorber 2 is disposed between the bumper cover 1 and the impact beam 3 to absorb impact energy. When the energy absorber 2 is subject to an impact greater than its critical elastic force, it cracks and must therefore be replaced. However, in the conventional bumper system, since the energy absorber is integrally formed, the whole bumper system must be replaced, increasing the repairing costs.

SUMMARY OF THE INVENTION

Therefore, the present invention has been made in an effort to solve the problems of the related art.

An object of the present invention is to provide a bumper system that is designed to have a light weight and a small volume while providing a high impact absorption performance, and that is designed to comprise individual components that can be replaced when they are damaged by impact, thereby reducing repairing cost.

To achieve the object, the present invention provides a bumper system including a bumper cover; an energy absorber formed of a synthetic resin material through a foam molding process; an impact beam for supporting the energy absorber, the impact beam being formed of a glass mat thermoplastic and having a "C"-shaped section; and a stay for connecting the impact beam to a vehicle body, wherein tips are formed on front upper and lower portions of the impact beam, and a web portion is formed on the impact beam between the tips, and tip insertion grooves in which the tips are inserted are formed on an inner surface of the energy absorber, and a pressure receiving surface corresponding to the web portion is formed on the inner surface of the energy absorber.

According to the present invention, the impact beam is designed to maintain a sufficient rigidity and strength with a minimum thickness by increasing a sectional quadratic moment and a sectional coefficient by forming tips on the upper and lower portions thereof. In addition, since the web portion having a gentle curve is formed between the tips to support the energy absorber, a stress concentration phenomenon that may occur at a portion where the energy absorber contacts the tips can be prevented. As a result, a local crack that may occur at a portion where the energy absorber contacts the tips or a damage of the damper cover can be prevented.

Furthermore, because the high strength reinforcing sheet is formed on only a mid-portion of the impact beam in a lateral direction of the vehicle in the course of the compression molding process of the GMT, by being inserted in a mold for the impact beam, the strength of the impact beam can be effectively enhanced with minimum expenses.

In addition, since the energy absorber is divided into the central portion and the side portions, it is possible to replace only a damaged portion, thereby saving repairing costs. Furthermore, since the foam expansion of the central portion is less than those of the both sides, that is, since only the central portion is densely formed in the foam molding process, materials can be saved, reducing the weight of the energy absorber.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF PREFERRED EMBODIMENTS

Now, preferred embodiments of the present invention will be described in detail with reference to the annexed drawings. First, in adding reference symbols to respective elements shown on the drawings, it is noted that identical elements are represented by an identical symbol if possible although they are shown in different drawings.

Figure 1:
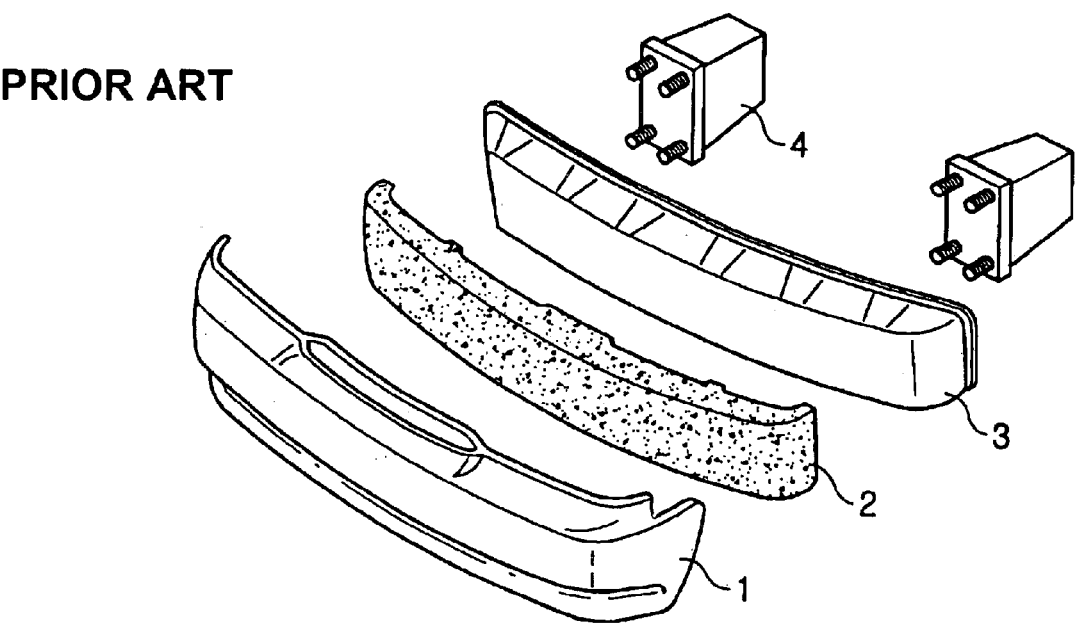
FIG. 1 is an exploded perspective view of a conventional bumper system.
Figure 2:
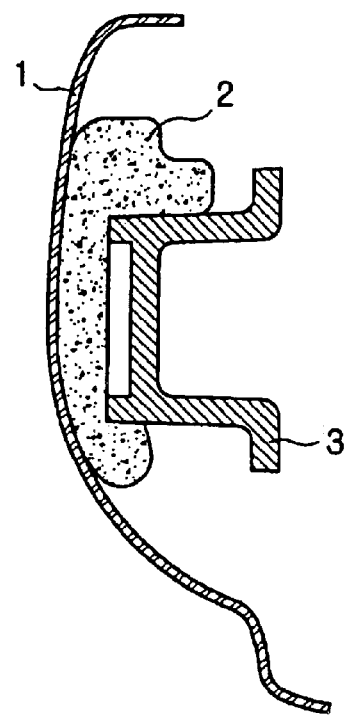
FIG. 2 is a longitudinal sectional view of a conventional bumper system.
Figure 3:
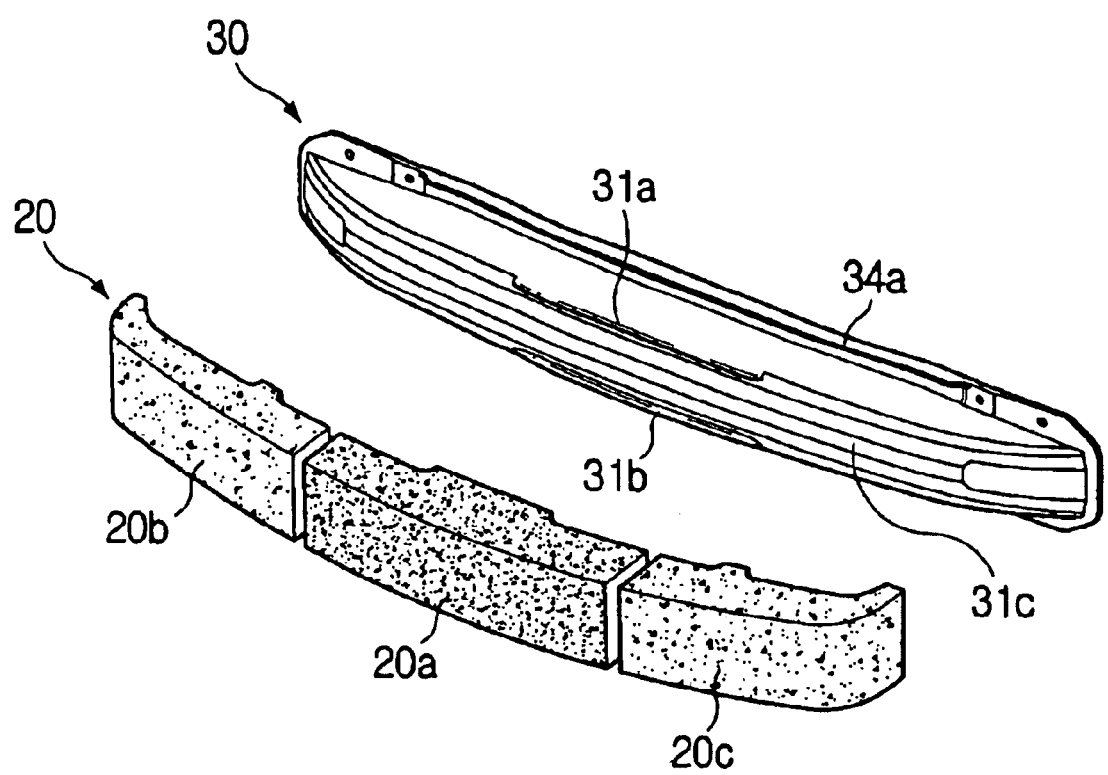
FIG. 3 is an exploded view of a major part of a bumper system according to a preferred embodiment of the present invention.
Figure 4:
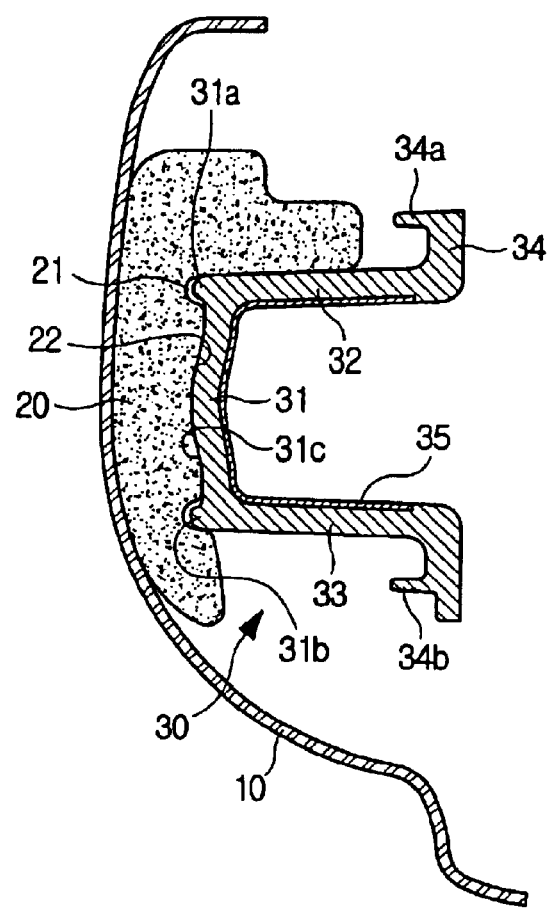
FIG. 4 is a longitudinal sectional view of a bumper system according to a preferred embodiment of the present invention.

FIGS. 3 and 4 show a bumper system according to a preferred embodiment of the present invention.

As shown in the drawing, similar to the conventional bumper system, the inventive bumper system also comprises a bumper cover 10, an energy absorber 20, an impact beam 30, and a stay (not shown). Respectively formed on upper and lower portions of a front side 31 of the impact beam 30 are tips 31a and 31b for enhancing a sectional quadratic moment and a sectional coefficient. A web portion 31c for supporting the energy absorber 20 is formed on the front side of the impact beam 30 between the tips 31a and 31b. The web portion 31c is concaved frontward, having a smooth curve.

According to a result obtained from a test using a bumper beam in which the tips 31a and 31b are only formed without forming the web portion 31c, it is noted that a stress-concentration phenomenon occurs at a portion where the energy absorber 20 contacts the tips 31a and 31b. As a result, the energy absorber 20 is locally cracked, causing the bumper cover to be damaged in a severe case.

Accordingly, as shown in FIG. 4, the web portion 31c concaved frontward is further formed on the impact beam 30 between the tips 31a and 31b, and at the same time, tip insertion grooves 21 are formed on upper and lower portions of an inner surface of the energy absorber 20. In addition, a pressure-receiving portion 22 corresponding to the web portion 31c is formed on the energy absorber 20 between the tip insertion grooves 21. The pressure-receiving portion 22 closely contacts the web portion 31c. By this structure, a local crack of the energy absorber 20 can be perfectly prevented.

It is preferable that the tip insertion grooves 21 are formed such that small gaps can be maintained between the tip insertion grooves 21 and the tips 31 a without them closely contacting each other.

Meanwhile, it is noted that a maximum thickness obtained by compression-molded GMT is about 15–17 mm. Therefore, when the impact beam 30 is formed of the GMT, it is very difficult to meet the strict regulations of North America for vehicles in a trend that bumper mounting space is reduced.

Therefore, according to a preferred embodiment of the present invention, when forming the GMT impact beam 30 using a compression molding process, a high strength reinforcing sheet 35 such as Twintex (trademark of Vetrotex) and Tepex (trademark of DuPont) is inserted in the mold to be formed together with the impact beam 30 through the compression molding process, thereby further enhancing the rigidity and strength of the bumper system. As a result, it becomes possible to make the impact beam 30 have sufficient rigidity and strength without an additional process while forming the GMT with a necessary minimum thickness.

Figure 5A:
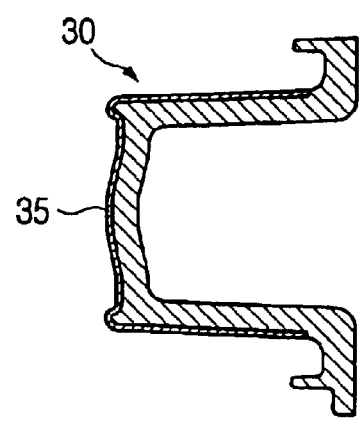
FIGS. 5A, 5B, and 5C are longitudinal sectional views illustrating a mounting structure of a reinforcing sheet according to a preferred embodiments of the present invention.
Figure 5B:
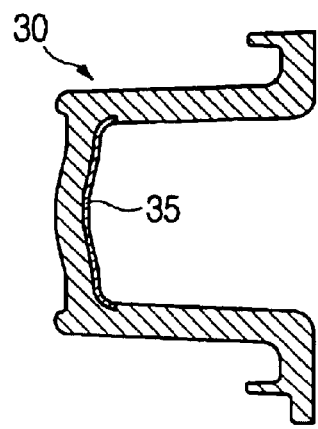
Figure 5C:
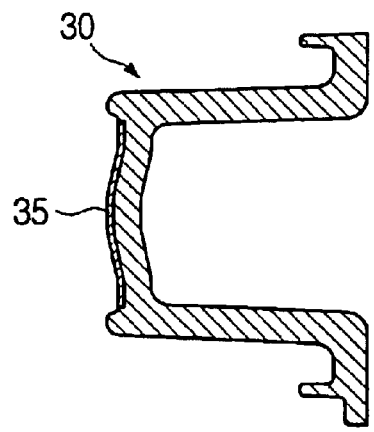

As it is preferable that the reinforcing sheet 35 is formed at a necessary minimum portion, as shown in FIGS. 4 and 5a, one of inner and outer surfaces of the impact beam 30 is entirely covered with the reinforcing sheet 35, or as shown in FIGS. 5b and 5c, one of inner and outer surfaces of the web portion 31c is coated with the reinforcing sheet 35. More preferably, the reinforcing sheet 35 is formed on a mid-portion of the impact beam 30 with a length of about 200–400 mm in a lateral direction of the vehicle. The reinforcing sheet 35 is simultaneously molded with the GMT. That is, the GMT 30 that has passed through a heater and the reinforcing sheet 35 are stacked and inserted into the mold, after which the mold is depressed by a cooling press, thereby forming the impact beam 30 covered with the reinforcing sheet 35.

The reference numerals 31, 32, 33, and 34 that are not described above indicate front, top, bottom, and flange portions of the impact beam 30, respectively. The reference numerals 34a and 34b indicate reinforcing ribs formed on the flange portion 34.

Meanwhile, the energy absorber 20 is formed of polypropylene bead or urethane bead through a foam molding process. At this point, in order to make it possible to replace only a damaged portion caused by a vehicle crash, the energy absorber 20 is divided into a central portion 20a and both side portions 20 and 20c. In the foam molding process, the central portion 20a is expanded by preferably 5–15 times, and the both sides 20b and 20c are expanded by preferably 15–40 times. That is, only the central portion that is subject to higher impact is densely formed in the foam molding process, so material can be saved, reducing the weight of the energy absorber 20.

In the above-described bumper system of the present invention, the impact beam is designed to maintain a sufficient rigidity and strength with a minimum thickness by increasing a sectional quadratic moment and a sectional coefficient by forming tips on the upper and lower portions thereof. In addition, since the web portion having a gentle curve is formed between the tips to support the energy absorber, a stress concentration phenomenon that may occur at a portion where the energy absorber contacts the tips can be prevented. As a result, a local crack that may occur at a portion where the energy absorber contacts the tips or a damage of the damper cover can be prevented.

Furthermore, because the high strength reinforcing sheet is formed on only a mid-portion of the impact beam in a lateral direction of the vehicle in the course of the compression molding process of the GMT, by being inserted in a mold for the Impact beam, the strength of the impact beam can be effectively enhanced with minimum expenses. In addition, since the energy absorber is divided into the central portion and the side portions, it is possible to replace only a damaged portion, thereby saving repairing costs. Furthermore, since the foam expansion of the central portion is less than those of the both sides, that is, since only the central portion is densely formed in the foam molding process, materials can be saved, reducing the weight of the energy absorber.

While the present invention has been described in detail, it should be understood that various changes, substitutions and alterations can be made hereto without departing from the spirit and scope of the invention as defined by the appended claims.

What is claimed is:

1. A bumper system comprising:

a bumper cover;

an energy absorber formed of a synthetic resin material through a foam molding process;

an impact beam for supporting the energy absorber, the impact beam being formed of a glass mat thermoplastic and having a "C"-shaped section; and a stay for connecting the impact beam to a vehicle body, wherein tips are formed on front upper and lower portions of the impact beam, and a web portion is formed on the impact beam between the tips, and tip insertion grooves in which the tips are inserted are formed on an inner surface of the energy absorber, and a pressure receiving surface corresponding to the web portion is formed on the inner surface of the energy absorber.

2. The bumper system of claim 1, wherein the tip insertion grooves are formed such that small gaps can be maintained between the tip insertion grooves and the tips.

3. The bumper system of claim 1, wherein a reinforcing sheet is simultaneously formed on a mid-portion of the impact beam in a lateral direction in the course of a compression molding process for the impact beam.

4. The bumper system of claim 1, wherein the energy absorber is divided into a central portion and side portions.

5. The bumper system of claim 4, wherein a foam expansion rate of the central portion is less than those of the side portions.

* * * * *